(12) United States Patent
Liao (10) Patent No.: US 12,474,371 B2
(45) Date of Patent: Nov. 18, 2025

(54) MEASUREMENT SYSTEM AND PROBE TIP LANDING METHOD

(71) Applicant: Winbond Electronics Corp., Taichung (TW)

(72) Inventor: Hsueh-Cheng Liao, Yunlin County (TW)

(73) Assignee: WINDBOND ELECTRONICS CORP., Taichung (TW)

( * ) Notice: Subject to any disclaimer, the term of this patent is extended or adjusted under 35 U.S.C. 154(b) by 455 days.

(21) Appl. No.: 18/170,760

(22) Filed: Feb. 17, 2023

(65) Prior Publication Data

US 2024/0280605 A1 Aug. 22, 2024

(51) Int. Cl.
*G01Q 30/02* (2010.01)
*G01Q 20/00* (2010.01)

(52) U.S. Cl.
CPC .............. *G01Q 30/02* (2013.01); *G01Q 20/00* (2013.01)

(58) Field of Classification Search
CPC ................................. G01Q 30/02; G01Q 20/00
See application file for complete search history.

(56) References Cited

U.S. PATENT DOCUMENTS

| | | | |
|---|---|---|---|
| 7,891,016 B2 | 2/2011 | Lee et al. | |
| 9,995,763 B2 | 6/2018 | Osborne et al. | |
| 10,373,799 B2 | 8/2019 | Neuman | |
| 2015/0109432 A1* | 4/2015 | Dixon | G01N 21/6456 348/79 |
| 2024/0126057 A1* | 4/2024 | Breuer | G01N 15/0205 |

FOREIGN PATENT DOCUMENTS

| | | |
|---|---|---|
| TW | 201504630 A | 2/2015 |
| TW | 201941325 A | 10/2019 |
| TW | I741791 B | 10/2021 |

* cited by examiner

*Primary Examiner* — Nicole M Ippolito
(74) *Attorney, Agent, or Firm* — Birch, Stewart, Kolasch & Birch, LLP (57) ABSTRACT

A probe tip landing method for a measurement system is provided. The probe tip landing method includes performing a first descending operation to lower a probe toward a sample by a first descending distance; performing a second descending operation to lower the probe toward the sample; and performing an inspection operation during the second descending operation. The inspection operation includes an imaging operation, scanning the sample to obtain a first image including a probe tip of the probe; and a determining operation, checking the first image to determine that in the first image, whether a region connected with the probe tip becomes bright. The probe tip landing method further includes in response to the region connected with the probe tip in the first image becoming bright, determining that the probe has contacted a surface of the sample and the probe has landed successfully.

19 Claims, 4 Drawing Sheets

MEASUREMENT SYSTEM AND PROBE TIP LANDING METHOD

BACKGROUND OF THE INVENTION

Field of the Invention

The present invention relates to a probe tip landing method, and, in particular, to a probe tip landing method that utilizes the brightness and darkness of images of scanning electron microscope for determining landing or not.

Description of the Related Art

With the advancement of technology, the size of semiconductor devices continuously scales down to the nanometer dimension. Therefore, it is needed to introduce the scanning electron microscope (SEM) to assist the measurement for the sample of semiconductor device. Meanwhile, extremely thin nano-scale probes are required for measurement.

In general, the traditional probe-landing process is manually operated. Moreover, whether the probe contacts the sample needs to be determined by the horizontal movement of the probe, wherein the horizontal movement is caused by the further lowering of the probe after contacting the sample. However, the manually-operated probe-landing process takes a lot of time and is performed slowly to avoid that the probe and the sample are damaged due to collision. Therefore, in order to save manpower and time during the probe-landing process, and at the same time, avoid damaging the probe and sample, an automatic probe-landing method for SEM is needed.

BRIEF SUMMARY OF THE INVENTION

An embodiment of the present invention provides a probe tip landing method for a measurement system including a scanning electron microscope. The probe tip landing method comprises performing a first descending operation to lower a probe of the measurement system toward a first region of a sample by a first descending distance; after the first descending operation, performing a second descending operation to lower the probe toward the first region of the sample; and performing an inspection operation during the second descending operation. The inspection operation comprises an imaging operation, scanning the sample to obtain a first image, wherein the first image includes a probe tip of the probe; and a determining operation, checking the first image to determine that in the first image, whether a region connected with the probe tip becomes bright. The probe tip landing method further comprises in response to the region connected with the probe tip in the first image becoming bright, determining that the probe has contacted a surface of the first region of the sample and the probe has landed successfully.

An embodiment of the present invention provides a measurement system including a scanning electron microscope (SEM), wherein the SEM has an electron source, a lens system, and a detector. The measurement system comprises a probe; a stage, configured to carry a sample; a motor system, configured to raise and lower the probe, wherein the motor system includes a coarse motor and a fine motor; and a processing device. The processing device is configured to perform following operations: driving the coarse motor to perform a first descending operation to lower the probe toward a first region of the sample by a first descending distance; after the first descending operation, driving the fine motor to perform a second descending operation to lower the probe toward the first region of the sample; and performing an inspection operation during the second descending operation. The inspection operation comprises an imaging operation, scanning the sample to obtain a first image, wherein the first image includes a probe tip of the probe; and a determining operation, checking the first image to determine that in the first image, whether a region connected with the probe tip becomes bright. The processing device is further configured to perform: in response to the region connected with the probe tip in the first image becoming bright, determining that the probe has contacted a surface of the first region of the sample and the probe has landed successfully.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

Figure 1:
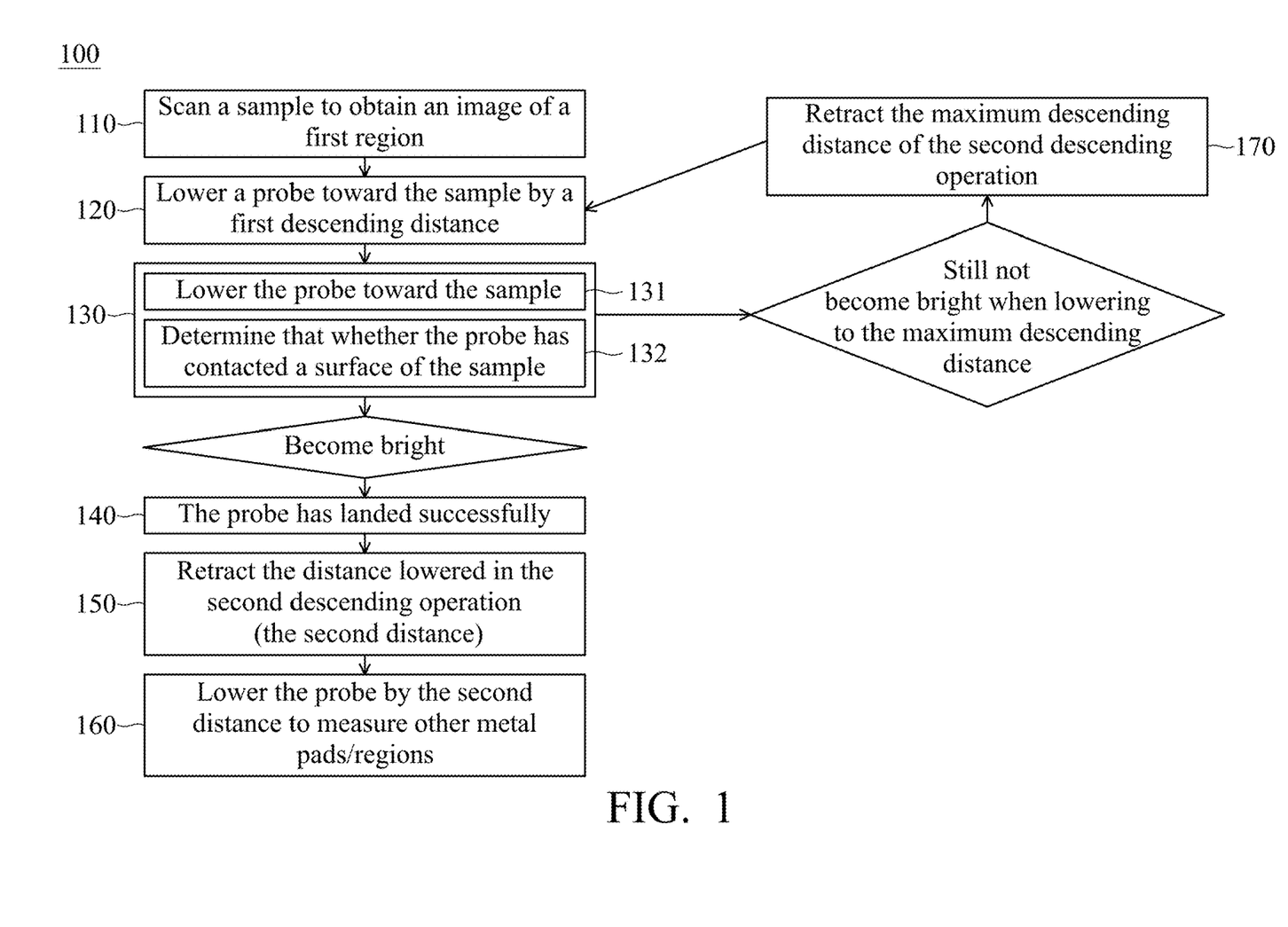
FIG. 1 illustrates a flow chart of a probe tip landing method for a measurement system, in accordance with embodiments of the present disclosure.

FIG. 1 illustrates a flow chart of a method 100 of a probe tip landing method for a measurement system, wherein the measurement system includes a scanning electron microscope (SEM), in accordance with embodiments of the present disclosure. It is noted that, additional operations may be provided before, during or after the method 100, and some operations described can be moved, replaced, or eliminated for additional embodiments of the method 100.

In operation 110, a first image of a sample is obtained by scanning the sample through the SEM, wherein the first image is a SEM image. In one embodiment, the first image includes at least a portion of a probe, such as a probe tip of the probe. Moreover, the first image includes at least a portion of the sample, such as a first region of the sample. In one embodiment, the first region of the sample includes a plurality of metal pads used to measure a plurality of semiconductor devices on the sample. In certain embodiments, the first region of the sample only includes a single metal pad. In other embodiments, the first region of the sample is a test key, the test key includes a single/a plurality of metal pads for testing the contact between the probe and the sample, wherein the single/the plurality of metal pads are not connected to the semiconductor devices.

In operation 120, a first descending operation is performed to lower the probe of the measurement system toward the sample by a first descending distance. Specifically, the first descending operation lowers the probe toward the first region of the sample by the first descending distance. For example, operation 120 lowers the probe toward the sample by the first descending distance through a coarse motor of the measurement system.

Next, operation 130 is performed, wherein operation 130 includes operation 131 and operation 132. The method 100 performs operation 132 while performing operation 131. In operation 131, the method 100 performs a second descending operation to lower the probe of the measurement system toward the first region of the sample. Specifically, the method 100 first lowers the probe by the first descending distance in the first descending operation of the operation 120, and then further lowers the probe toward the first region of the sample in the second descending operation of operation 131. For example, operation 131 lowers the probe toward the sample through a fine motor of the measurement system.

In operation 131, the second descending operation has a maximum descending distance. That is, during the second descending operation of operation 131, the descending amount of the probe will not exceed the maximum descending distance. In one embodiment, the first descending distance of the first descending operation of operation 120 is less than the maximum descending distance of the second descending operation of operation 131. For example, in one embodiment, the maximum descending distance of the second descending operation of operation 131 is 6 micrometer (μm), and the first descending distance of the first descending operation of operation 120 is 5 μm, but the present disclosure is not limited thereto. In certain embodiments, the first descending distance is equal to the maximum descending distance. In other embodiments, the first descending distance is greater than the maximum descending distance.

Next, the method 100 continuously repeats operation 132 while performing the second descending operation of operation 131. In operation 132, the method 100 performs an inspection operation to determine that whether the probe has contacted a surface of the sample. The inspection operation of operation 132 includes an imaging operation and a determining operation. In the imaging operation, the method 100 obtained a second image of the sample. For example, the second image of the sample is obtained by scanning the sample through the SEM, wherein the second image is a SEM image. In one embodiment, similar to the first image of operation 110, the second image of the imaging operation includes at least a portion of the probe (e.g., the probe tip of the probe) and at least a portion of the sample (e.g., the first region of the sample).

After obtaining the second image by the imaging operation, the method 100 performs the determining operation. In the determining operation, the method 100 checks the second image to determine that in the second image, whether a region connected with the probe tip of the probe becomes bright. In response to the region connected with the probe tip of the probe in the second image becoming bright, the method 100 determines that the probe has contacted the surface of the sample. For example, the method 100 determines that the probe has contacted a surface of a metal pad in the first region of the sample. On the other hand, in response to the region connected with the probe tip of the probe in the second image not becoming bright, the method 100 determines that the probe has not contacted the surface of the sample.

Figure 2A:
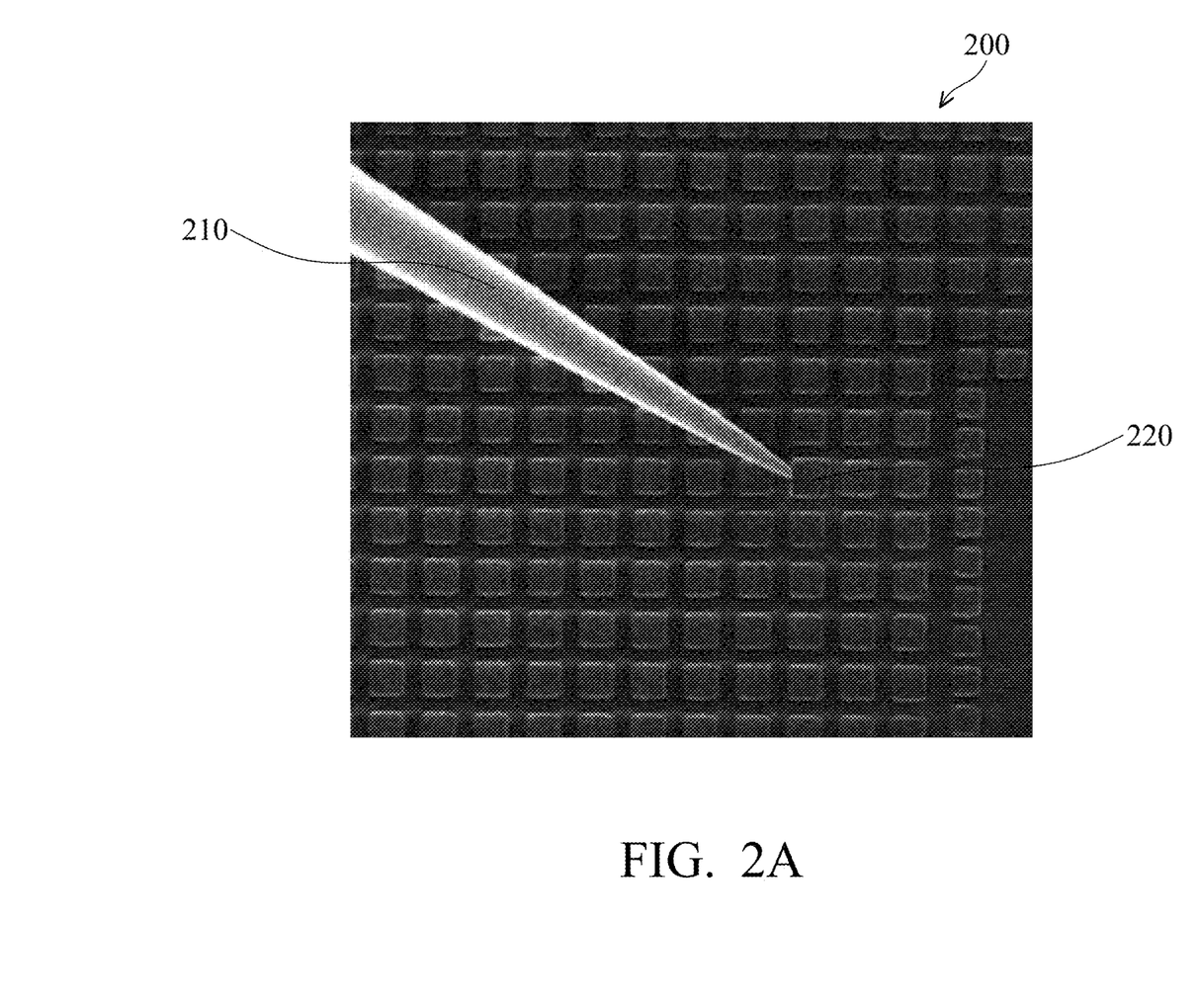
FIG. 2A illustrates a schematic diagram of SEM image where the region connected with the probe tip does not become bright, in accordance with embodiments of the present disclosure.

FIG. 2A illustrates a schematic diagram of the second image (SEM image) where the region connected with the probe tip in the second image does not become bright, in accordance with embodiments of the present disclosure. As shown in FIG. 2A, a region 220 connected with a probe tip of a probe 210 does not become bright. In one embodiment, the region 220 is one metal pad in a first region of a sample 200. In the SEM image of FIG. 2A, the region 220 is kept in a "dark" state like other regions of the sample 200. As described above, in response to the region connected with the probe tip of the probe in the second image not becoming bright, the method 100 determines that the probe has not contacted the surface of the sample.

Figure 2B:
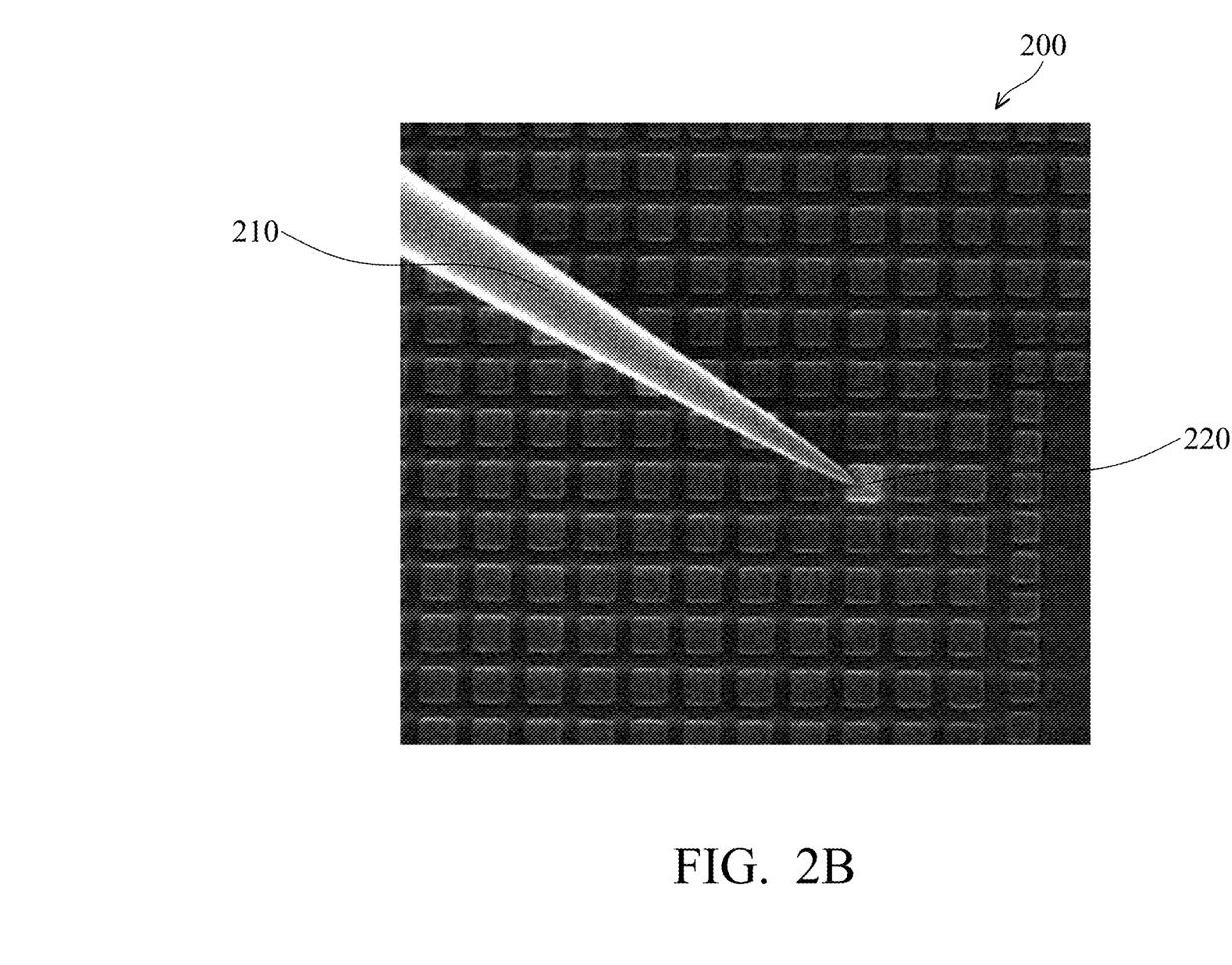
FIG. 2B illustrates a schematic diagram of SEM image where the region connected with the probe tip has become bright, in accordance with embodiments of the present disclosure.

FIG. 2B illustrates a schematic diagram of the second image (SEM image) where the region connected with the probe tip in the second image has become bright, in accordance with embodiments of the present disclosure. As shown in FIG. 2B, the region 220 connected with the probe tip of the probe 210 has become bright. In the SEM image of FIG. 2B, the region 220 is in a "bright" state compared with other regions of the sample 200. As described above, in response to the region connected with the probe tip of the probe in the second image becoming bright, the method 100 determines that the probe has contacted the surface of the sample.

As shown in FIG. 2A and FIG. 2B, after the probe contacts the sample, since the probe being a conductor connects the region it contacts to the ground, the region of the sample being contacted by the probe will become bright. As shown in FIG. 2B, after the region 220 is contacted by the probe 210, more secondary electrons are generated since the region 220 is connected to the ground, and thus the region 220 becomes bright. As a result, in the measurement system utilizing SEM, it can be determined that whether a region is in contact with the probe by whether the region becomes bright or not.

In one embodiment, the determining operation in operation 132 is performed by directly determining whether the region connected with the probe tip is brighter than other regions of the sample in the second image. In other embodiments, the determining operation in operation 132 is performed by comparing the second image with the first image of operation 110 to determine whether the region connected with the probe tip become bright. For example, according to the variety of the luminance (e.g., Y in YUV encoding) in the second image between 0 and 255, the determining operation may determine whether the brightness of the region connected to the probe tip changes. For example, when the luminance value of a region increases toward 255, it means that the region becomes bright. It is noted that, the present disclosure is not limited thereto, and any suitable method can be used to determine whether a region connected to the probe tip of the probe becomes bright.

Returning to FIG. 1, when the determining operation of operation 132 determines that the probe has contacted the surface of the sample, the method 100 proceeds to operation 140. In operation 140, it is determined that the probe has landed successfully, and the lowering of the probe is stopped, that is, the second descending operation of operation 131 is stopped.

As described above, the method 100 continuously repeats operation 132 while performing operation 131. That is, during the process of lowering the probe toward the sample in operation 131, the method 100 continuously repeats the inspection operation of operation 132 to determine whether the probe has contacted the surface of the sample. In other words, operation 132 continuously repeats the process that includes obtaining the second image (imaging operation) and determining whether the region connected with the probe tip of the probe becomes bright according to the second image (determining operation). This repeated process continues until the method 100 determines that the probe has contacted the surface of the sample. In one embodiment, the method 100 repeats the operation 132 every fixed time period, wherein the fixed time period such as several milliseconds.

However, as described above, the second descending operation has the maximum descending distance. Therefore, when the descending amount of the probe in the second descending operation of operation 131 reaches the maximum descending distance such that the probe cannot continue to be lowered, and the region connected with the probe tip of the probe in the second image still not become bright, the process of repeating operation 132 is also stopped, although the probe still not contact the surface of the sample at this moment. When the descending amount of the probe in the second descending operation of operation 131 reaches the maximum descending distance, and the determining operation of operation 132 still determines that the probe has not contacted the surface of the sample (since the region connected with the probe tip of the probe in the second image still not become bright), the method 100 will stop the lowering of the probe and proceed to operation 170.

In operation 170, the method 100 performs a first ascending operation to retract the maximum descending distance lowered in the second descending operation. In other words, the first ascending operation in operation 170 raises the probe in the opposite direction of the sample by the maximum descending distance. Next, after operation 170, the method 100 performs the first descending operation of operation 120 again to lower the probe toward the sample by the first descending distance again.

As described above, in one embodiment, the first descending distance of the first descending operation of operation 120 is less than the maximum descending distance of the second descending operation of operation 131. Therefore, in this embodiment, the first descending operation of operation 120 that is performed again will not cause the probe to collide with the sample and result in damage to the probe and/or the sample during the process of lowering the probe. This is because in the previous operation 131, it has been confirmed that lowering the maximum descending distance does not bring the probe into contact with the sample, and thus lowering the first descending distance that is less than the maximum descending distance will not bring the probe into contact with the sample.

In one embodiment, the first descending operation of operation 120 uses the coarse motor of the measurement system to move the probe, while the second descending operation of operation 131 uses the fine motor of the measurement system to move the probe.

As shown in FIG. 1, the method 100 repeats operation 120, operation 130 and operation 170 until determining that the probe has contacted the surface of the sample. After determining that the probe has contacted the surface of the sample, the method 100 proceeds to operation 140.

In operation 140, the method 100 determines that the probe has landed successfully and stops lowering the probe. Afterward, in operation 150, the method 100 performs a second ascending operation to raise the probe in the opposite direction of the sample by a second distance. Then, in operation 160, the method 100 performs a measurement operation, the measurement operation moves the probe and/or the sample and lowers the probe by the second distance to make the probe contact other metal pad of the sample and execute measurement. The second distance described refers to the distance that the probe is lowered by the second descending operation during the last operation 131. Specifically, the second distance is the distance lowered in the last operation 131 (the second descending operation).

In general, on the surface of the sample, the adjacent regions/metal pads have similar heights. Therefore, after confirming that one metal pad can be contacted by lowering the probe by the second distance in the last operation 131, other metal pads near the one metal pad can be contacted by lowering the probe by the same second distance.

Figure 3:
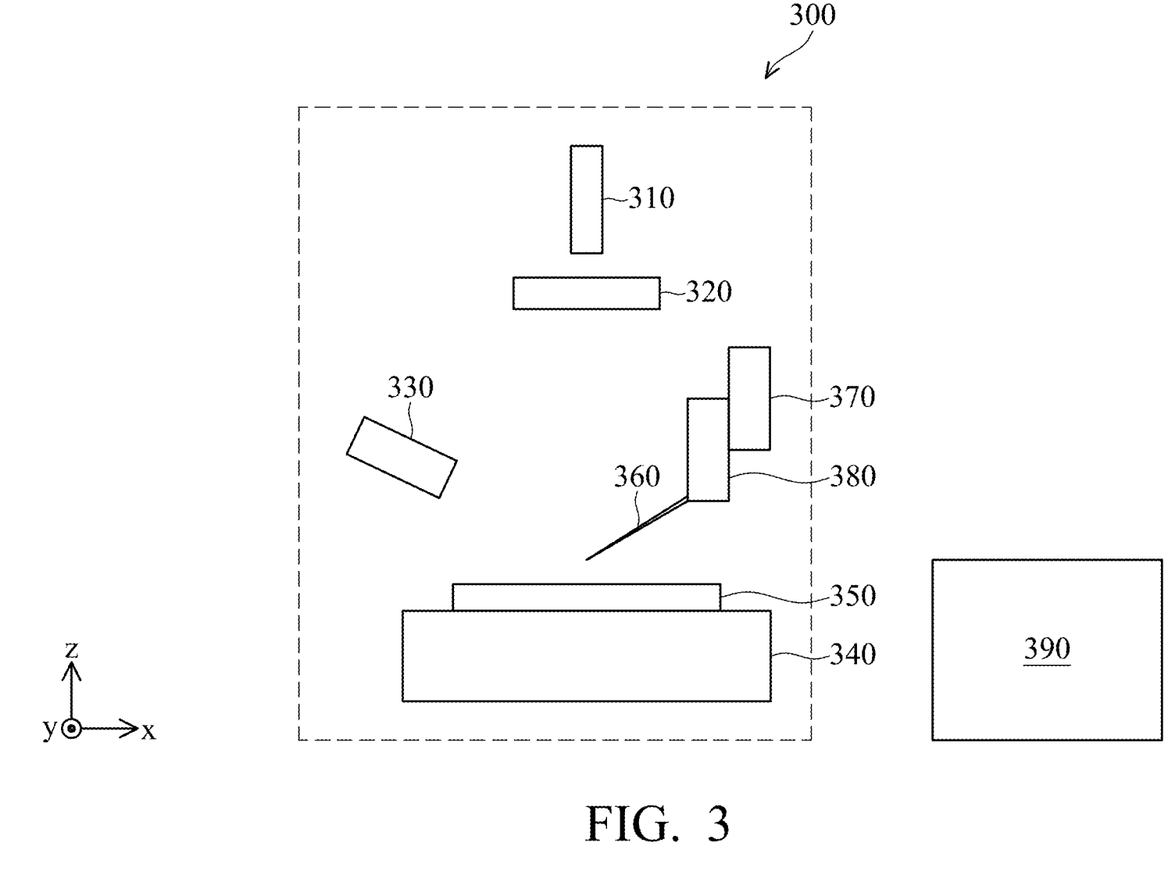
FIG. 3 illustrates a schematic diagram of an exemplary measurement system, in accordance with embodiments of the present disclosure.

FIG. 3 illustrates a schematic diagram of an exemplary measurement system 300, in accordance with embodiments of the present disclosure. The measurement system 300 may be used to perform the method 100 described herein. The measurement system 300 includes a scanning electron microscope (SEM). The measurement system 300 includes an electron source 310, a lens system 320, a detector 330, and a stage 340. The lens system 320 is, for example, one or more sets of electromagnetic lenses. The stage 340 may be used to carry a sample (e.g., a sample 350) and move the sample in horizontal directions (e.g., the X direction and the Y direction). The electron source 310 may be used to emit an electron beam toward the sample 350, and the lens system 320 may be used to focus the electron beam onto the sample 350. The detector 330 may receive the secondary electrons from the sample 350, wherein the secondary electrons are produced due to emitting the electron beam of the electron source to the sample 350. The detector 330 further generates SEM images of the sample 350, for example, generates SEM images by a processing device 390 described below.

The measurement system 300 further includes a probe 360 and a motor system, wherein the motor system includes a coarse motor 370 and a fine motor 380. The probe 360 is used to contact the sample 350 and measure the sample 350. The coarse motor 370 and the fine motor 380 are used to raise and lower the probe 360 in, for example, the Z direction.

The measurement system 300 further includes the processing device 390. The measurement system 300 may perform the method 100 described herein by the processing device 390. For example, the method 100 may be implemented as a computer program product and stored in a storage device (not shown) of the measurement system 300. The computer program product stored in the storage device can be loaded and executed by the processing device 390 to perform the method 100 in the measurement system 300.

It is noted that, for the purpose of simplicity and clarity, some components are omitted in the drawings herein. For example, the measurement system may further include coils for controlling the path of the electron beam, equipment for maintaining the vacuum, displays, and other components needed for performing the measurement.

When the method 100 implemented as a computer program product is executed by the processing device 390, the processing device 390 may perform the operations of the method 100. In operation 110, the processing device 390 scans the sample 350 and collects secondary electrons by the electron source 310, the lens system 320 and the detector 330 to obtain a first image of the sample 350. The first image includes at least a portion of the probe 360 (e.g., a probe tip of the probe 360) and at least a portion of the sample 350 (e.g., a first region of the sample 350).

In the first descending operation of operation 120, the processing device 390 drives the coarse motor 370 to lower the probe 360 toward the first region of the sample 350 by the first descending distance, for example, lower the probe 360 along the Z direction. In one embodiment, the coarse motor 370 is a step motor.

Operation 130 includes operation 131 and operation 132, wherein the processing device 390 performs operation 132 during performing operation 131. In the second descending operation of operation 131, the processing device 390 drives the fine motor 380 to lower the probe 360 toward the first region of the sample 350. As described above, the second descending operation of operation 131 has the maximum descending distance. The maximum descending distance is equal to the maximum distance that the fine motor 380 can lower the probe 360. In one embodiment, the fine motor 380 is a piezoelectric motor.

The inspection operation of operation 132 includes the imaging operation and the determining operation. In the imaging operation, the processing device 390 scans the sample 350 and collects secondary electrons by the electron source 310, the lens system 320 and the detector 330 to obtain a second image of the sample 350. The second image includes at least a portion of the probe 360 (e.g., the probe tip of the probe 360) and at least a portion of the sample 350 (e.g., the first region of the sample 350).

In the determining operation, the processing device 390 checks the second image obtained in the imaging operation to determine whether a region connected with the probe tip of the probe 360 in the second image becomes bright. In response to the region connected with the probe tip of the probe 360 in the second image becoming bright, the processing device 390 determines that the probe 360 has contacted the surface of the sample 350. On the other hand, in response to the region connected with the probe tip of the probe 360 in the second image not becoming bright, the processing device 390 determines that the probe has not contacted the surface of the sample 350.

The processing device 390 continuously repeats operation 132 while performing operation 131. That is, during the process of lowering the probe 360 toward the sample 350 in operation 131, the processing device 390 continuously repeats the inspection operation of operation 132 until determining that the probe 360 has contacted the surface of the sample 350. When the processing device 390 determines that the probe 360 has contacted the surface of the sample 350, the processing device 390 performs operation 140.

In operation 140, the processing device 390 determines that the probe 360 has landed successfully (i.e., the probe 360 has contacted the surface of the sample 350) and stops lowering the probe 360, that is, stops driving the fine motor 380 so that the probe 360 no longer lowers toward the sample 350.

When the descending amount of the probe in the second descending operation reaches the maximum descending distance, and the processing device 390 still determines that the probe 360 has not contacted the surface of the sample 350 in the inspection operation, the processing device 390 will stop lowering the probe 360 and perform operation 170.

In the first ascending operation of operation 170, the maximum descending distance lowered in the second descending operation is retracted by driving the fine motor 380. As described above, the method 100 repeatedly performs operation 120, operation 130 (including operation 131 and operation 132), and operation 170 until determining that the probe has contacted the surface of the sample. Therefore, the processing device 390 also repeatedly performs operation 120, operation 130 (including operation 131 and operation 132), and operation 170 until determining that the probe 360 has contacted the surface of the sample 350. When the processing device 390 determines that the probe 360 has contacted the surface of the sample 350, the processing device 390 performs operation 140, and then performs operation 150.

In the second ascending operation of operation 150, the processing device 390 drives the fine motor 380 to raise the probe 360 in the opposite direction of the sample 350 by the second distance. As described above, the second distance is the distance that the probe lowered in the second descending operation when it is determined that the probe has contacted the surface of the sample. Therefore, the second distance is equivalent to the distance that the fine motor 380 lowers the probe 360 during the second descending operation.

After operation 150, the processing device 390 performs operation 160. In the measurement operation of operation 160, the processing device 390 drives the stage 340 to move the sample 350, such that the probe 360 moves relative to the sample 350. The processing device 390 further drives the fine motor 380 to lower the probe 360 by the second distance to make the probe 360 contact metal pads of the sample 350 and execute measurement.

In some embodiments, the processing device 390 drives the stage 340 to move the sample 350, and drives the fine motor 380 to lower the probe 360 by the second distance to make the probe 360 contact metal pads in the first region of the sample 350 and execute measurement. In other embodiments, the processing device 390 drives the stage 340 to move the sample 350 such that the probe 360 is above a second region adjacent to the first region, and drives the fine motor 380 to lower the probe 360 by the second distance, so as to make the probe 360 contact other metal pads in the second region of the sample 350 and execute measurement. In the embodiment where the first region of the sample 350 is a test key, the processing device 390 also moves the sample 350 and lowers the probe 360 by the second distance to make the probe 360 contact other metal pads in the second region of the sample 350 and execute measurement.

The present disclosure provides an automatic probe tip landing method, and a scanning electron microscope (SEM)-based measurement system utilizing this method. The probe tip landing method utilizes a processing device to determine SEM images. The processing device determines whether the probe tip has contacted the surface of the sample according to the difference in brightness caused by difference of the number of secondary electrons. For example, when the region connected with the probe tip of the probe in the SEM image becomes bright, it means that the probe has contacted the surface of the sample. In contrast, if the region connected with the probe tip of the probe in the SEM image does not become bright, it means that the probe has not contacted the surface of the sample. As a result, compared with the traditional manually-operated probe-landing method, by processing the SEM image with the processing device, the automatic probe tip landing method provided by the present disclosure can save manpower and time during the probe-landing process, and at the same time, avoid damaging the probe and sample due to collision.

Although the present disclosure is disclosed in the foregoing embodiments, it is not intended to limit the present disclosure. Those skilled in the art may make some changes and alterations without departing from the spirit and scope of the present disclosure. Therefore, the protection scope of the present disclosure should be determined by those specified in the appended claims.

What is claimed is:

1. A probe tip landing method for a measurement system including a scanning electron microscope, comprising:

performing a first descending operation to lower a probe of the measurement system toward a first region of a sample by a first descending distance;

after the first descending operation, performing a second descending operation to lower the probe toward the first region of the sample;

performing an inspection operation during the second descending operation, wherein the inspection operation comprises:

an imaging operation, scanning the sample to obtain a first image through the scanning electron microscope, wherein the first image includes a probe tip of the probe; and a determining operation, checking the first image to determine that in the first image, whether a region connected with the probe tip becomes brighter due to more secondary electrons generated at the region; and in response to the region connected with the probe tip in the first image becoming brighter, determining that the probe has contacted a surface of the first region of the sample and the probe has landed successfully.

2. The probe tip landing method as claimed in claim 1, further comprising:

in response to the region connected with the probe tip in the first image not becoming brighter, determining that the probe has not contacted the surface of the first region of the sample; and repeatedly performing the inspection operation until determining that the probe has contacted the surface of the first region of the sample and the probe has landed successfully.

3. The probe tip landing method as claimed in claim 2, wherein the second descending operation has a maximum descending distance, and the probe tip landing method further comprises a first ascending operation, the first ascending operation comprises:

when the second descending operation has lowered the probe by the maximum distance, but the inspection operation still determines that the probe has not contacted the surface of the first region of the sample, stopping lowering the probe; and raising the probe in the opposite direction of the sample by the maximum descending distance.

4. The probe tip landing method as claimed in claim 3, wherein the first descending distance is less than the maximum descending distance.

5. The probe tip landing method as claimed in claim 3, further comprising repeatedly performing the first descending operation, the second descending operation, the inspection operation, and the first ascending operation until determining that the probe has contacted the surface of the first region of the sample and the probe has landed successfully.

6. The probe tip landing method as claimed in claim 1, further comprising after determining that the probe has contacted the surface of the first region of the sample and the probe has landed successfully, performing a second ascending operation to raise the probe in the opposite direction of the sample by a second distance.

7. The probe tip landing method as claimed in claim 6, wherein the second distance is equal to a descending amount that the probe is lowered in the second descending operation when it is determined that the probe has contacted the surface of the first region of the sample and the probe has landed successfully.

8. The probe tip landing method as claimed in claim 6, further comprising performing a measurement operation, the measurement operation lowers the probe by the second distance to make the probe contact metal pads in the first region of the sample and execute measurement.

9. The probe tip landing method as claimed in claim 6, wherein the first region is a test key, and the probe tip landing method further comprising a measurement operation, the measurement operation moves the probe to a second region of the sample and lowers the probe by the second distance to make the probe contact metal pads in the second region of the sample and execute measurement.

10. A measurement system including a scanning electron microscope (SEM), the SEM has an electron source, a lens system, and a detector, the measurement system comprises:

a probe;

a stage, configured to carry a sample;

a motor system, configured to raise and lower the probe, wherein the motor system includes a coarse motor and a fine motor; and a processing device, configured to perform following operations:

driving the coarse motor to perform a first descending operation to lower the probe toward a first region of the sample by a first descending distance;

after the first descending operation, driving the fine motor to perform a second descending operation to lower the probe toward the first region of the sample;

performing an inspection operation during the second descending operation, the inspection operation comprises:

an imaging operation, scanning the sample to obtain a first image through the scanning electron microscope, wherein the first image includes a probe tip of the probe; and a determining operation, checking the first image to determine that in the first image, whether a region connected with the probe tip becomes brighter due to more secondary electrons generated at the region; and in response to the region connected with the probe tip in the first image becoming brighter, determining that the probe has contacted a surface of the first region of the sample and the probe has landed successfully.

11. The measurement system as claimed in claim 10, wherein the processing device is further configured to perform:

in response to the region connected with the probe tip in the first image not becoming brighter, determining that the probe has not contacted the surface of the first region of the sample; and repeatedly performing the inspection operation until determining that the probe has contacted the surface of the first region of the sample and the probe has landed successfully.

12. The measurement system as claimed in claim 11, wherein the second descending operation has a maximum descending distance, and the processing device is further configured to perform a first ascending operation, the first ascending operation comprises:

when the second descending operation has lowered the probe by the maximum distance, but the inspection operation still determines that the probe has not contacted the surface of the first region of the sample, stopping lowering the probe; and driving the fine motor to raise the probe in the opposite direction of the sample by the maximum descending distance.

13. The measurement system as claimed in claim 12, wherein the first descending distance is less than the maximum descending distance.

14. The measurement system as claimed in claim 12, wherein the processing device is further configured to repeatedly perform the first descending operation, the second descending operation, the inspection operation, and the first ascending operation until determining that the probe has contacted the surface of the first region of the sample and the probe has landed successfully.

15. The measurement system as claimed in claim 10, wherein the processing device is further configured to perform:

after determining that the probe has contacted the surface of the first region of the sample and the probe has landed successfully, performing a second ascending operation to raise the probe in the opposite direction of the sample by a second distance.

16. The measurement system as claimed in claim 15, wherein the second distance is equal to a descending amount that the probe is lowered in the second descending operation when it is determined that the probe has contacted the surface of the first region of the sample and the probe has landed successfully.

17. The measurement system as claimed in claim 15, wherein the processing device is further configured to perform a measurement operation, the measurement operation drives the stage to move the sample and drives the fine motor to lower the probe by the second distance, so as to make the probe contact metal pads in the first region of the sample and execute measurement.

18. The measurement system as claimed in claim 15, wherein the first region is a test key, and wherein the processing device is further configured to perform a measurement operation, the measurement operation drives the stage to move the sample such that the probe is above a second region of the sample, and drives the fine motor to lower the probe by the second distance, so as to make the probe contact metal pads in the second region of the sample and execute measurement.

19. The measurement system as claimed in claim 10, wherein the coarse motor is a step motor and the fine motor is a piezoelectric motor.

* * * * *